E. J. McCLELLAN.
MONITOR LATHE SPINDLE AND CHUCK CONSTRUCTION.
APPLICATION FILED JULY 22, 1908.

927,424.

Patented July 6, 1909.
3 SHEETS—SHEET 1.

Witnesses:
Waldo M Chapin

Inventor
Edward J. McClellan
By his Attorneys

E. J. McCLELLAN.
MONITOR LATHE SPINDLE AND CHUCK CONSTRUCTION.
APPLICATION FILED JULY 22, 1908.
927,424.
Patented July 6, 1909.
3 SHEETS—SHEET 2.
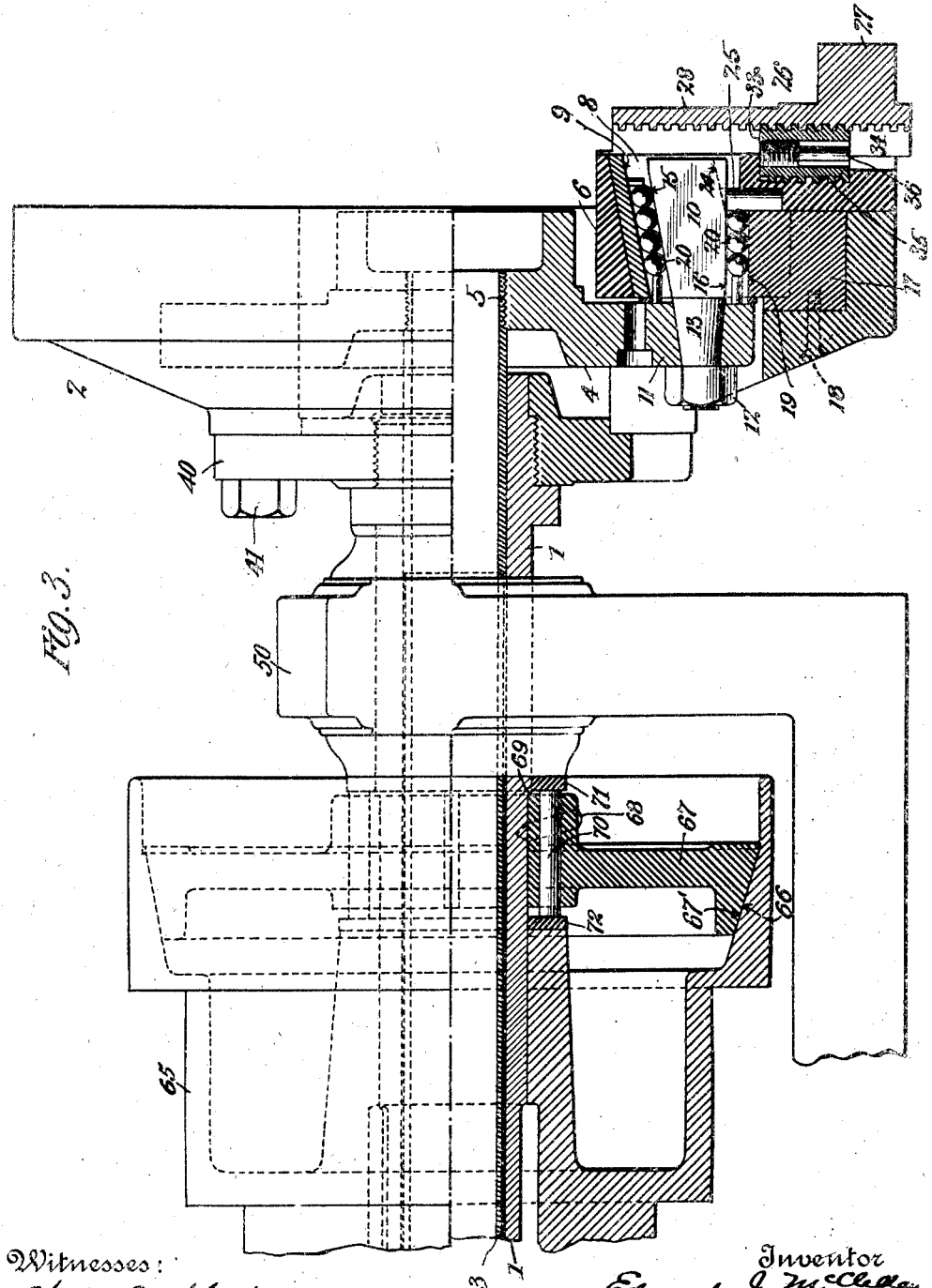

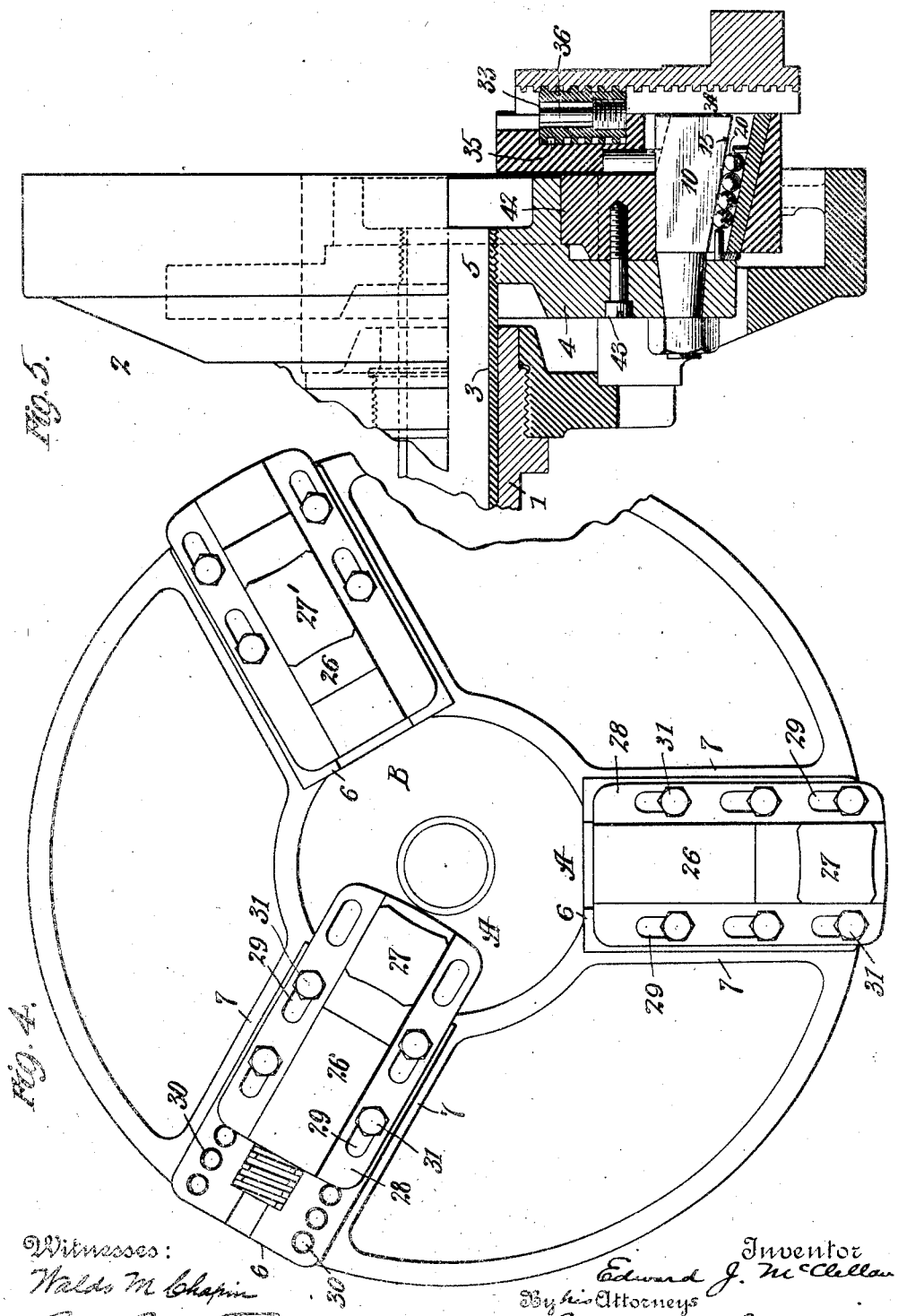

UNITED STATES PATENT OFFICE.

EDWARD J. McCLELLAN, OF NEW YORK, N. Y., ASSIGNOR TO THE GARVIN MACHINE COMPANY, A CORPORATION OF NEW YORK.

MONITOR-LATHE SPINDLE AND CHUCK CONSTRUCTION.

No. 927,424.      Specification of Letters Patent.      Patented July 6, 1909.

Application filed July 22, 1908. Serial No. 444,719.

*To all whom it may concern:*

Be it known that I, EDWARD J. MC-CLELLAN, a citizen of the United States, residing at the city of New York, in the borough of Manhattan and State of New York, have invented certain new and useful Improvements in Monitor-Lathe Spindle and Chuck Construction, of which the following is a full, clear, and exact description.

My invention relates to a spindle and chuck construction for a monitor lathe, the principal object being to provide a spindle and chuck adapted to operate with work of irregular shapes as well as ordinary centered or concentric work. These characteristics are, of course, in addition to the usual requisites of a monitor lathe, that is to say, the quick engagement and disengagement of the work by the movement of a single lever or part after the initial adjustments have been made.

From another aspect my invention consists in the provision of means for simultaneously releasing the chuck, disengaging the spindle from its driving means, and applying a brake thereto. It is evident that in this aspect the invention is not dependent on any particular kind of chuck used.

From still another aspect, my invention consists in the construction by which all the above mentioned functions are obtained through the axial movement of the lathe spindle and its associated co-axial parts. All of these movements are impelled from a single operating tube within the spindle, and which may be termed a draw tube. This draw tube is connected to operate the chuck in whatever initial adjusted relation the latter may be put, either for clamping work internally or externally, and in any possible eccentric or concentric relation.

My invention also includes certain features of adjustment by which the mechanism is maintained at perfect efficiency to exercise its functions regardless of wear of the parts.

With these and other objects in view, the invention consists in the features of construction and combination, as hereinafter set forth and claimed.

Figure 1:
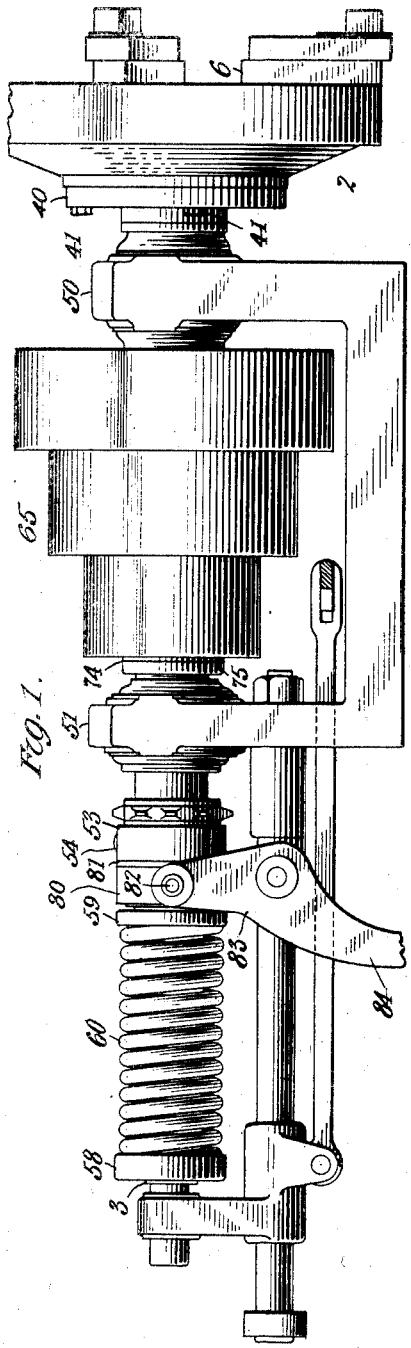
Figure 2:
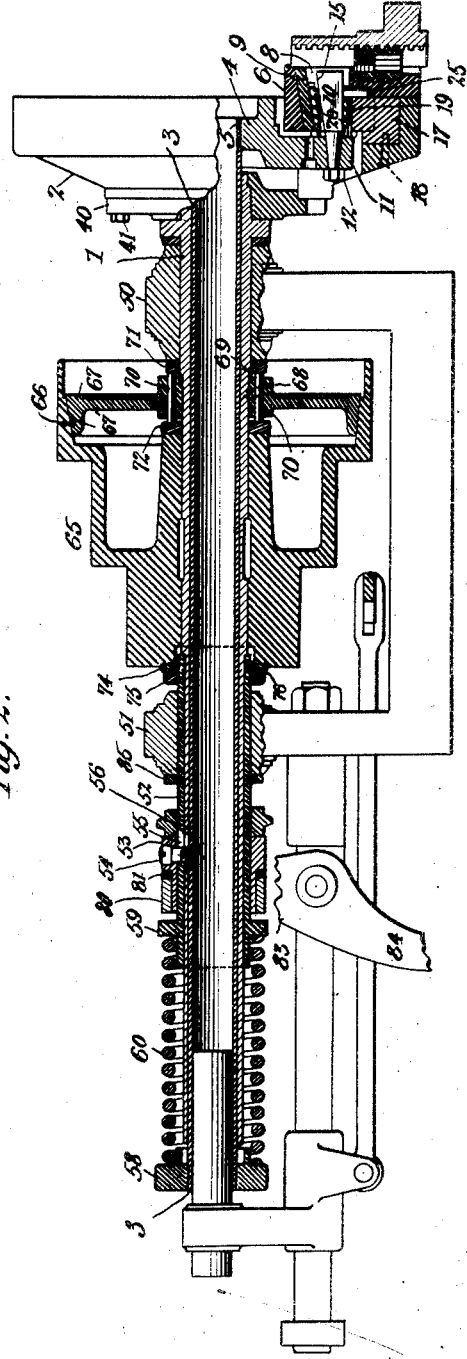

In the drawings: Figure 1 is a side elevation of a monitor lathe spindle and chuck embodying the principles of my invention; Fig. 2 is a longitudinal sectional view of the same; Fig. 3 is a detail view partly in section showing the chuck and certain features of the driving clutch; Fig. 4 is a face view of the chuck; and Fig. 5 is a side view of the same partly in section showing a different arrangement of the jaws.

Referring to the drawings in which like parts are designated by the same reference sign, 1 indicates the lathe spindle, and 2 a face plate threaded onto the nose thereof in the usual way.

3 designates what I have termed the draw tube, and 4 what I shall term a draw plate threaded to the end of the draw tube at 5, and movable axially within the face plate 2 through a limited range.

6 designates jaw supporting blocks, each of which is guided to have a radial movement on the face plate 2. For this purpose the face plate has radial undercut ways or guides 7, in which said blocks 6 are accurately received and guided. Each jaw supporting block 6 has a transverse recess 8, one face 9 of which is inclined with respect to the radial path of movement of the block.

10 designates wedges fastened to projecting portions 11 of the draw plate 4, by means of the nuts 12, said wedges having slightly tapered portions 13, which are tightened in correspondingly formed holes of the draw plate by said nuts. Each wedge 10 has a face 15, corresponding in inclination to the face 9 already described. The opposite side 16, of the wedge may be parallel with its direction of motion.

17 designates blocks fastened within the face plate 2 by screws 18, and which have faces 19, parallel to the faces 16 of the wedges 10.

20 designates balls or rollers interposed between the faces 9 and 15, and 16 and 19 respectively. These balls or rollers constitute anti-friction means to permit a free endwise movement of the wedges through the blocks 6. It is evident that when the draw tube 3 is pulled inward into the lathe spindle, that the wedges 10 will be drawn to the left in the figures of the drawing, thereby impelling the jaw supporting blocks 6 inward, by virtue of the coöperating wedge surfaces 9 and 15. In this action the wedges are supported against yielding outwardly by the abutments formed by the surfaces 19, together with the adjacent balls or rollers 20. When the draw tube is released and the draw plate 4 moved to the right in the drawing, the jaw supporting blocks 6 are correspondingly eased or released. In practice I provide means for positively impelling the jaw supporting blocks outwardly when they are eased or released from the work. For this purpose each wedge 10 has a groove 24, on the face 16, the bottom of which is inclined in a direction parallel to the wedge 15.

25 designates a pin forming part of the jaw supporting block 6 and riding in the groove 24, so as to engage the bottom surface thereof. It is evident that when the wedge moves to the right in the drawings, the pin 25 will be impelled outwardly, thereby correspondingly moving its block 6 to release the work.

26 designates the jaws proper, of which a number of different kinds are provided, interchangeably attachable upon the jaw-supporting blocks 6. Not only are there provided different kinds of jaws 26, but each jaw is attachable upon its supporting block 6 in different radial positions and endwise reversed relations. I also provide means for making a fine adjustment of the jaws upon their supporting blocks, and holding the jaws in any particular relation with adequate security. The jaw 26 has a flat supporting portion 28, with elongated slots or holes 29, on either side thereof. Each jaw-supporting block 6 has a series of threaded holes 30 on each side adapted to register with the slots 29 of the jaw member.

31 designates screws adapted to be received in the threaded holes 30 through the slots 29. It is evident that by engaging the screws 31 in selected holes of the series on the supporting blocks 6, that the jaw members can be fastened in various different radial positions on their supports 6. Not only can the jaws be fastened in different radial positions on their supports, but each jaw is capable of being reversed end for end, which gives a still further range of effective positions.

It will be observed by reference to Fig. 4 that I have devised two different kinds of jaws, of which one (designated A) has its work engaging portion 27 near the end of the plate 28, while another type designated B has the work engaging portion 27' near the center of the plate 28. One of the jaws of type A is shown with its engaging portion 27 turned inward, while the other jaw of type A has its engaging portion outermost. Of course different types of jaws, or different arrangements of type A jaw can be employed simultaneously, as in Fig. 4, on irregular work, or the jaws can be symmetrically arranged in the chuck for concentric work of widely varying diameters.

The jaws are positioned on their supporting blocks 6 in approximately the desired relation, but it is evident that they are capable of a limited radial movement for the length of the slots 29, through which the screws 31 are received. In order to make this adjustment and lock the jaw in any particular relation, I provide an externally threaded cylinder 33 inclosed between an internally threaded recess 34 of the plate 28, and an internal cylindrical cavity 35 of the block 6. The size and relation of the surfaces 34 and 35 are such as to snugly receive the threaded cylinder 33 between them, with the threads of said cylinder in mesh with the threads of said recess 34. The cavity 35 in the block 6 has a limited longitudinal extent corresponding to the length of said cylinder 33, so that the latter is maintained in a predetermined radial relation on said block. Under these circumstances a radial movement is imparted to the plate 28 and the jaw 26 by turning said cylinder 33. The cylinder 33 can be turned by the insertion of any suitable non-circular rod or key in an opening 36 of corresponding shape in the end of the cylinder. The internally threaded recess 34 of the plate 28 extends from end to end thereof, so that a properly meshing engagement may be made for any position which the jaw may have upon its supporting block. Each jaw may be finely adjusted by turning the threaded cylinder 33 thereof, and when the jaws are correctly positioned for a particular kind of work, they are tightened by setting the various screws 31.

I have referred to the fact that the chuck is equally operable to grasp work internally or externally. In order to grasp work internally, the chuck is partly taken to pieces and rearranged. For this purpose the face plate 2 is made with a removable back plate 40, secured to the main portion of the face plate by the screws 41. The main body 2 of the face plate is open at the rear opposite the points of the draw plate 4 which support the wedges 10. Accordingly if the wedges 10 are loosened from the draw plate 4 by the removal of the nuts 12, it is possible to withdraw the draw plate 4 out of the face plate 2 through the rear open side thereof. The jaw supporting blocks 6 can then be passed radially inward on the face plate and removed. Abutment blocks 17 are next taken out by releasing the screws 18. The parts are then rearranged, as shown in Fig. 5, with the wedges 10 reversed upon the draw plate 4. Instead of blocks 17, a ring 42 is fastened to the draw plate 4 by screws 43, and serves as an abutment for the wedges 10 to prevent their yielding inwardly. The jaw supporting blocks 6 having been reinserted in the face plate in reversed relation, it is evident that their surfaces 9 are in position to coöperate with the inclined faces 15 of the wedges, there being the usual balls or rollers 20 interposed to provide an antifriction engagement. The jaws may be assembled upon the supporting blocks in exactly the same way as in the previous arrangement of the chuck. With this arrangement, it is evident that the jaws are impelled outwardly when the draw tube 3 is drawn into the spindle, instead of being impelled inwardly. This arrangement of the chuck is therefore adapted to engage work internally.

The spindle 1 revolves in the bearings 50 and 51 of the head stock. The bearing 50 directly engages the spindle, but at the bearing 51 there is an intermediate sleeve 52, which revolves with the spindle and furnishes the bearing surface therefor, as will later more fully appear.

53 designates a collar upon the sleeve 52, and this collar is fixed to and made rigid with the draw tube 3 by the connecting screw or pin 54, which passes through an elongated slot 55, in the sleeve 52, and an elongated slot 56 in the spindle. By this construction the collar 53 is made a part of and moves with the draw tube under all circumstances, and at the same time all of these parts, including the collar 53, the sleeve 52, the spindle 1, and the draw tube 3, are constrained to rotate together. The draw tube is, however, capable of a certain longitudinal movement within the spindle, limited by the extent of the slot 56. At the same time the draw tube is longitudinally movable with respect to the sleeve 52 and the latter is longitudinally movable with respect to the spindle. These relations constitute an important part of my invention and secure a variety of functions, as will later more fully appear.

58 designates a collar fixed to the extreme rear end of the draw tube 3, and 59 indicates another collar forming part of the sleeve 52. Between collars 58 and 59 I provide a strong spiral compression spring 60, which constantly presses the collar 58 to the left in the drawings and impels the draw tube inward in the spindle, so that it tends to tighten the jaws of the chuck. This spring impelled movement continues, of course, until the jaws engage the work or reach their limit of movement, unless said spring impelled movement is resisted at an intermediate point of its range in some other way. In the above statement the collar 59 has been considered as if fixed to the spindle. As a matter of fact, the collar 59 is not fixed to the spindle, but forms a part of the sleeve 52 thereon. In the normal operation of the lathe, however, the sleeve 52 becomes fixed in a predetermined relation upon the spindle, so that the collar 59 is virtually a part of the spindle when the lathe is running.

I will now consider the means by which the sleeve 52 attains a fixed relation on the spindle when the lathe is running.

65 designates a cone pulley loose upon the spindle 1 between the bearings 50 and 51. The largest cone pulley has an internal conical surface 66, forming the driving member of a friction clutch.

67 designates the other clutch member having an external cone surface 67' to engage the surface 66. The clutch member 67 is rigidly fixed to the spindle 1 by the set screw 68. To absolutely insure against the clutch member 67 being displaced upon the spindle, I shoulder the latter at 69, adjacent to clutch member 67. A thrust bearing is provided to prevent longitudinal displacement of the cone pulley 65 to the right in the drawings, but this thrust bearing is not effective to prevent a movement of the spindle and clutch member 67 to the right. For this purpose I provide a plurality of pins 70, preferably of hardened steel, loosely received in holes through the clutch member 67 in an axial direction.

71 and 72 designate collars or bearing surfaces lying against the bearing 50 and the cone pulley 65 respectively. The ends of the pins 70 abut against the collars 71 and 72 under all circumstances, and prevent said cone pulley from moving to the right. But the loose engagement of these pins in clutch member 67 permits a longitudinal movement of the latter, and it is evident that the pins are free to revolve with said clutch member with a continuous bearing engagement between or with collars 71 and 72, so that the cone pulley may revolve independently of the spindle or vice versa.

By the above mechanism, the clutch member 67 is disengaged from the cone pulley by moving the spindle to the right in the bearings, after which the cone pulleys may revolve independently of the spindle. At the other end a thrust bearing or abutment is provided for the cone pulley 65 by a collar 74, mounted on the sleeve 52. The collar 74 is adjustable longitudinally on said sleeve by means of a backing nut 75, which surrounds and is engaged upon a threaded portion of said sleeve. The collar 74 has a key engagement 76 with said sleeve 52, so that it cannot be turned on said sleeve and exert a force to tighten or loosen said nut 75 thereon.

The fact has already been referred to that the spring 60 exerts its force in both directions, so that its tension is constantly exerted against collar 59 and the sleeve 52 of which said collar forms a part. As the sleeve 52 has a thrust bearing or abutting engagement with cone pulley 65, through the collar 74, it follows that said cone pulley may be pressed to the right, either until its movement is limited by the engagement of the clutch surface 66 67', or in some other way. As the clutch member 67 is firmly engaged when the lathe is running, it takes up said thrust of said spring 60, which therefore exerts the useful function of keeping the clutch in engagement. From another aspect, it may be stated that when the lathe is running and the chuck is tight upon the work, the draw tube pulls the spindle to the left with all the force of said spring 60, which pressure of the spindle to the left is exactly resisted and neutralized by the engagement of the clutch surfaces 66, 67', impelled by sleeve 52 through the reaction of said spring 60. When the lathe, therefore, is running normally, everything is tight about the spindle and its rotating parts, the chuck being engaged in the work, and the clutch surfaces 66, and 67', being tightened with the full effective pressure of the spring 60. It will be seen that the bearings 50 and 51 take no part in the forces of transmission and reaction, as above described, so that the spindle is perfectly free to revolve in said bearings.

I will now describe the means by which the chuck jaws are released and the clutch surfaces 66 and 67' disengaged.

80 designates a collar loose on the sleeve 52 and located directly behind collar 53, and capable of having an endwise abutting engagement therewith through an intermediate washer 81 of anti-friction material. The collar 80 has trunnions 82, which are embraced and engaged by a bell crank lever 83, having a depending arm 84, which can be moved by a foot treadle, or in any desired way. When the lever 84 is moved to impel collar 80 to the right in the drawings, it is evident that said collar abuts against and correspondingly impels the collar 53 to the right. As the collar 53 has been described as fixed to the draw tube through the pin 54, it is evident that the draw tube will be moved to the right and the chuck jaws released from the work. Before the draw tube can commence its movement to the right to loosen the chuck jaws, however, the force of the spring 60 against collar 58 must be overcome. This spring pressure has hitherto been effective (while the lathe was running) to impel said draw tube and the lathe spindle to the left and keep clutch surfaces 66 and 67 in engagement. Accordingly the movement of the lever 84 has exerted two functions: first counteracting the said tension of the spring 60, which had previously kept both the chuck jaws and the clutch surfaces 66 and 67' in engagement; and, second, positively moving the draw tube 3 to the right, so as to separate the chuck jaws from the work. At this time the clutch surfaces 66 and 67' may or may not continue in engagement. There is no force tending to either engage or to separate them at this time. As the lever 84 continues to move and the draw tube 3 to be impelled to the right, a condition eventually occurs where the chuck jaws are expanded as much as possible, and the pin 54 has traversed the entire length of the slot 56 in the spindle. A still further movement of lever 84 therefore causes the pin 54 to impel the spindle to the right, carrying the clutch member 67, and positively disengaging the clutch surfaces 66, and 67'. The two functions have now been attained, of first releasing the chuck from the work and separating the jaws thereof, and second releasing the clutch surfaces 66 and 67' and separating them. From the very inception of movement of the lever 84, there has, however, been a braking force exerted to stop the rotation of the spindle. This braking force is established through a shoulder 85, forming part of the sleeve 52, and immediately adjacent to the bearing 51. The fact has been referred to that the initial movement of the lever 84 had the effect of relieving the endwise thrust of the spindle to the left which opposed and neutralized the tension or reaction of the cone pulley 65 to the right. Accordingly the tension or reaction of said cone pulley 65 to the right under the influence of the sleeve 52 is no longer opposed and neutralized. The cone pulley accordingly eases off from its abutting engagement against collar 74, and at the same time the shoulder 85 on the sleeve 52 comes into tight abutting engagement against the bearing 51 with all the force of the spring 60. As the sleeve 52 is constrained to rotate with the spindle through the pin 54, it is evident that a braking effect is exerted to stop the spindle by the pressure of the shoulder 85 against the bearing 51. Three functions are therefore secured by the movement of the lever 84: first, disengaging the chuck jaws and separating them from the work; second, disengaging and separating the clutch surfaces 66 and 67'; and, third, applying a braking pressure at the shoulder 85 tending to promptly arrest the rotation of the spindle. The spindle is therefore quickly stopped and the work may be expeditiously removed or inserted from the chuck. Conversely, the chuck is reëngaged, the clutch surfaces 66, 67', tightened, and the brake pressure removed by the return movement of the treadle actuated lever 84, after which the spindle rotates freely, under the action of the driving cone pulleys 65.

In the above action there is no reliance placed on the exact dimensions of any part liable to wear, by which the action might be interfered with. It is, however, essential that the shoulder 85 should bring up against the bearing 51 before collar 74 pushes the cone pulleys 65 tightly against the pins 70. In order that this latter condition may be always accurately maintained, regardless of wear, the collar 74 is made adjustable, as has been described. This collar is adjusted so as to transmit the thrust of the sleeve 52 to the cone pulley when the latter is engaged by the clutch member 67, but this thrust is transferred from collar 74 to shoulder 85 when said clutch pressure is relieved by the movement of clutch member 67 to the right. This single adjustment is the only one which is required to be accurately maintained in practice.

What I claim, is:—

1. In combination with a lathe spindle having a face plate, a draw plate having wedges movable axially in said face plate, said wedges being reversible to present their working faces outwardly or inwardly, and jaws guided by said face plate and impelled by said wedges to tighten inwardly or outwardly upon the work.

2. In combination with a lathe spindle having a chuck, means movable longitudinally through said spindle to tighten said chuck, a clutch member fixed to said spindle, a driving clutch member, a sleeve, and a pressure means acting to impel said movable means longitudinally in the spindle to tighten said chuck, and said clutch members through said sleeve.

3. In combination with a lathe spindle having a chuck, means for tightening said chuck, a clutch driving the spindle, a sleeve, and a pressure means acting to tighten said clutch through said sleeve, and said chuck through said means simultaneously.

4. In combination with a lathe spindle having a chuck, a draw tube for tightening said chuck, a clutch for driving the spindle and tightened by the longitudinal displacement thereof, brake surfaces for stopping the rotation of the spindle, and a spring displaced at one end by said draw tube and coöperating with one of said brake surfaces at the other end to tighten said chuck and said clutch when said draw tube is free, and to engage said brake surfaces with its full effective pressure when said draw tube is displaced to release the chuck.

5. In combination with a lathe spindle, a clutch for driving said lathe spindle, a stationary brake surface, a sleeve, a pressure means, and means for actuating said pressure means to tighten said clutch or impel said sleeve against said brake surface, as desired, with its full effective pressure.

6. In combination with a lathe spindle having a chuck, a sleeve surrounding said spindle, means extending through the spindle for tightening said chuck, a clutch having driving and driven members for driving said spindle, and a pressure means impelling said means and one member of said clutch to simultaneously tighten the clutch and said chuck.

7. In combination with a lathe spindle having a chuck, a sleeve surrounding said spindle, means extending through the spindle for tightening said chuck, a clutch having driving and driven members for driving said spindle, a pressure means impelling said means and one member of said clutch to simultaneously tighten the clutch and said chuck, and a device for displacing said means to release said chuck and the other member of said clutch.

8. In combination with a lathe spindle having a chuck, a sleeve surrounding said spindle and having a brake surface thereon, a stationary part having a coöperating brake surface, means extending through the spindle for tightening said chuck, a clutch having driving and driven members for driving said spindle, a pressure means impelling said first mentioned means and one member of said clutch through said sleeve to simultaneously tighten the clutch and said chuck, and a device for displacing said first mentioned means to release said chuck and displace the other member of said clutch, whereby an unbalanced longitudinal force is put on said sleeve to bring said brake surfaces into action.

9. In combination with a lathe spindle having a driven clutch member, a cone pulley therefor having a driving clutch member, a sleeve movable longitudinally on said spindle and engaging said cone pulley, said sleeve having a shoulder, an abutment therefor, and a pressure means for impelling said sleeve longitudinally to tighten said clutch members, and means for disengaging said clutch members whereby said shoulder operates as a brake surface.

10. In combination with a lathe spindle having a driven clutch member, a cone pulley having a driving clutch member, a sleeve engaging said cone pulley, a draw tube within the spindle and adapted to be normally locked thereto, and a pressure means for impelling said draw tube and said sleeve longitudinally in opposite directions.

11. In combination with a lathe spindle having a driven clutch member, a cone pulley having a driving clutch member, a sleeve engaging said cone pulley, a draw tube within the spindle and adapted to be normally locked thereto, and a spring for impelling said draw tube and said sleeve longitudinally in opposite directions, and means for positively moving said draw tube in opposition to said spring.

12. In combination with a lathe spindle having a chuck, a driven clutch member on said lathe spindle, a cone pulley having a driving clutch member, a sleeve on said spindle engaging said cone pulley, a draw tube for said chuck extending through the spindle, a pressure means for impelling said draw tube to tighten said chuck and engaging said sleeve to tighten said clutch members simultaneously, and means for positively displacing said draw tube in opposition to said spring whereby said clutch is released and the pressure on said driven clutch member withdrawn whereby said clutch members are disengaged.

13. In combination with a lathe spindle having a chuck, a driven clutch member on said lathe spindle, a driving clutch member, a sleeve abutting against said driving clutch member to engage the same with the driven clutch member, said sleeve having a shoulder, a stationary part having a brake surface adapted to be engaged by said shoulder, a draw tube extending through the spindle for tightening said chuck, a pressure means for impelling said draw tube and said sleeve longitudinally in opposite directions and means for positively moving said draw tube in opposition to said spring, whereby said chuck is released, said clutch members disengaged, and said shoulder made to exert a braking function.

14. In combination with a lathe spindle having a chuck, means for tightening said chuck, a clutch for driving said spindle, a sleeve surrounding said spindle, and a pressure means engaging said first mentioned means and reacting against one member of said clutch through the medium of said sleeve, whereby the clutch and chuck are simultaneously tightened.

15. In combination with a lathe headstock having a chuck, means for releasing the work from the chuck, a friction clutch, means for releasing the friction clutch, means for braking the rotation of the lathe spindle, and mechanism for simultaneously actuating said means.

In witness whereof I subscribe my signature, in the presence of two witnesses.

EDWARD J. McCLELLAN.

Witnesses:
   J. T. WILLIAMS,
   CHAS. T. LUTHER.